US007917750B2

(12) United States Patent
Novoa et al.

(10) Patent No.: US 7,917,750 B2
(45) Date of Patent: Mar. 29, 2011

(54) VIRTUAL USER AUTHENTICATION SYSTEM AND METHOD

(75) Inventors: Manuel Novoa, Houston, TX (US);
Valiuddin Y. Ali, Houston, TX (US);
Mark J. Altendorf, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1194 days.

(21) Appl. No.: 11/492,617

(22) Filed: Jul. 25, 2006

(65) Prior Publication Data
US 2008/0028441 A1    Jan. 31, 2008

(51) Int. Cl.
*H04L 29/00* (2006.01)
(52) U.S. Cl. ............................. 713/164; 707/6
(58) Field of Classification Search .................. 713/164; 707/6
See application file for complete search history.

(56) References Cited

U.S. PATENT DOCUMENTS

| | | | | |
|---|---|---|---|---|
| 6,003,050 A * | 12/1999 | Silver et al. .................... 715/205 |
| 6,247,148 B1 * | 6/2001 | Annicchiarico et al. ........ 714/45 |
| 6,971,014 B1 * | 11/2005 | Hagmeier et al. ............. 713/182 |
| 7,417,626 B2 * | 8/2008 | Aull et al. ..................... 345/172 |
| 7,734,583 B2 * | 6/2010 | Vitanov et al. ................ 707/621 |
| 2004/0080529 A1 | 4/2004 | Wojcik |
| 2004/0177264 A1 * | 9/2004 | Anson et al. ................... 713/200 |
| 2004/0215971 A1 | 10/2004 | Nam |
| 2006/0036731 A1 | 2/2006 | Mossman et al. |
| 2006/0101128 A1 | 5/2006 | Waterson |
| 2006/0136910 A1 * | 6/2006 | Brickell et al. .................... 718/1 |

OTHER PUBLICATIONS

International Search Report Dated Jan. 22, 2008.
State Intellectual Property Office, P.R. China, First Office Action dated Jun. 22, 2010, pp. 4.
English translation of State Intellectual Property Office, P.R. China, First Office Action dated Jun. 22, 2010, pp. 14.

* cited by examiner

*Primary Examiner* — Vivek Srivastava
*Assistant Examiner* — Helai Salehi

(57) ABSTRACT

A virtual user authentication system comprising a virtual machine manager (VMM) communicatively coupled to a user operating system (OS) and a service OS, the VMM configured to receive keystroke input destined for an application executing on the user OS and communicate the keystroke input to the service OS, the keystroke input processed by the service OS.

14 Claims, 4 Drawing Sheets

VIRTUAL USER AUTHENTICATION SYSTEM AND METHOD

BACKGROUND OF THE INVENTION

A user of a computing platform is usually authenticated by validating one or more security credentials associated with the user (e.g., a username, a password, a personal identification number (PIN), etc.). The authentication information may also be used in combination with cryptographic tokens or smartcards to provide multi-factor authentication to strengthen the security and authenticity of the user. However, various programs exist that perform memory scanning and/or keystroke logging. Thus, the security credential is susceptible to being compromised (e.g., when used to access a security-hardened cryptographic token or smartcard).

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
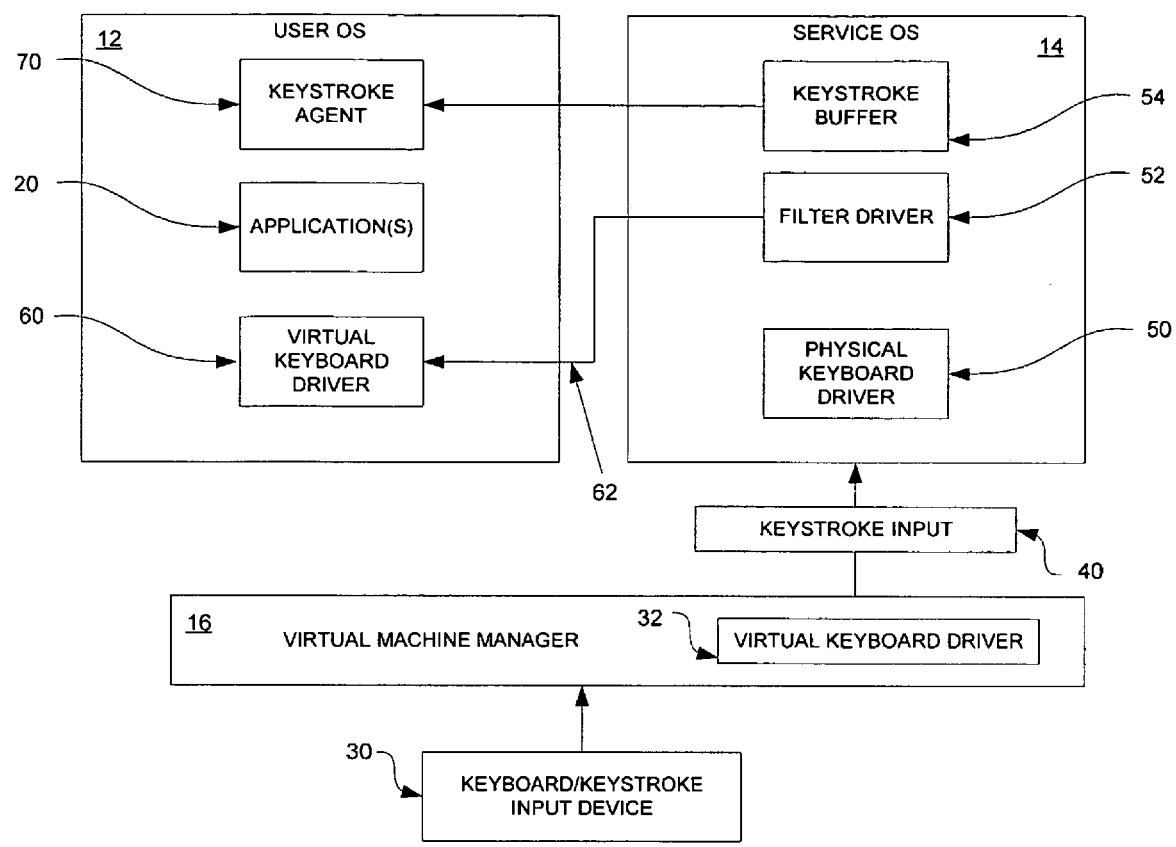
FIG. 1 is a diagram illustrating an embodiment of virtual user authentication system in accordance with the present invention.
Figure 2A:
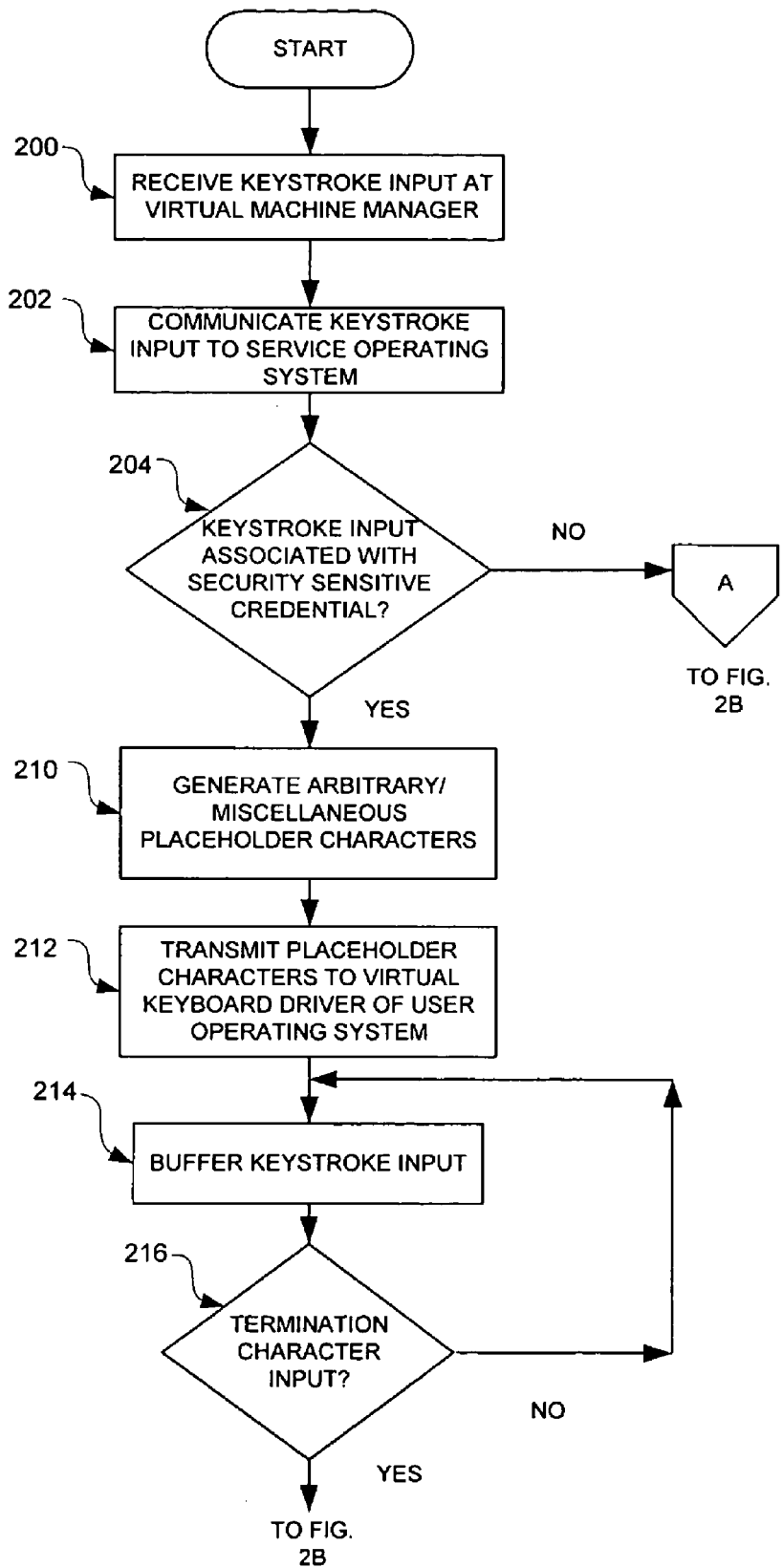
FIGS. 2A and 2B are flow diagrams illustrating an embodiment of a virtual user authentication method in accordance with the present invention.
Figure 2B:
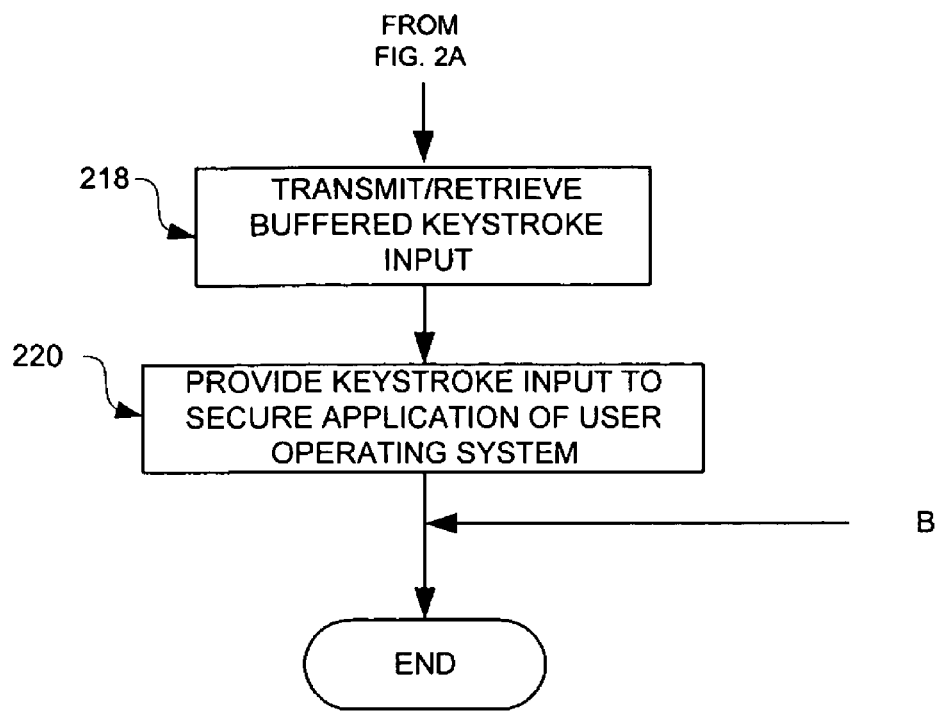
Figure 2B:
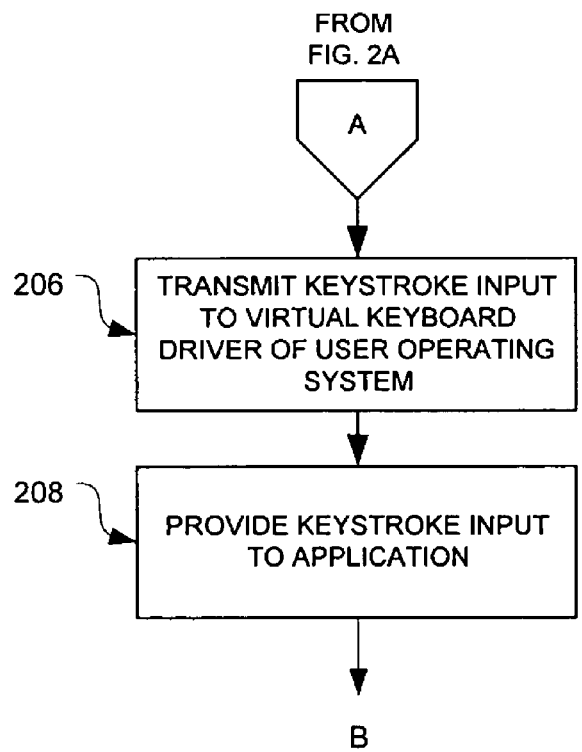
Figure 3:
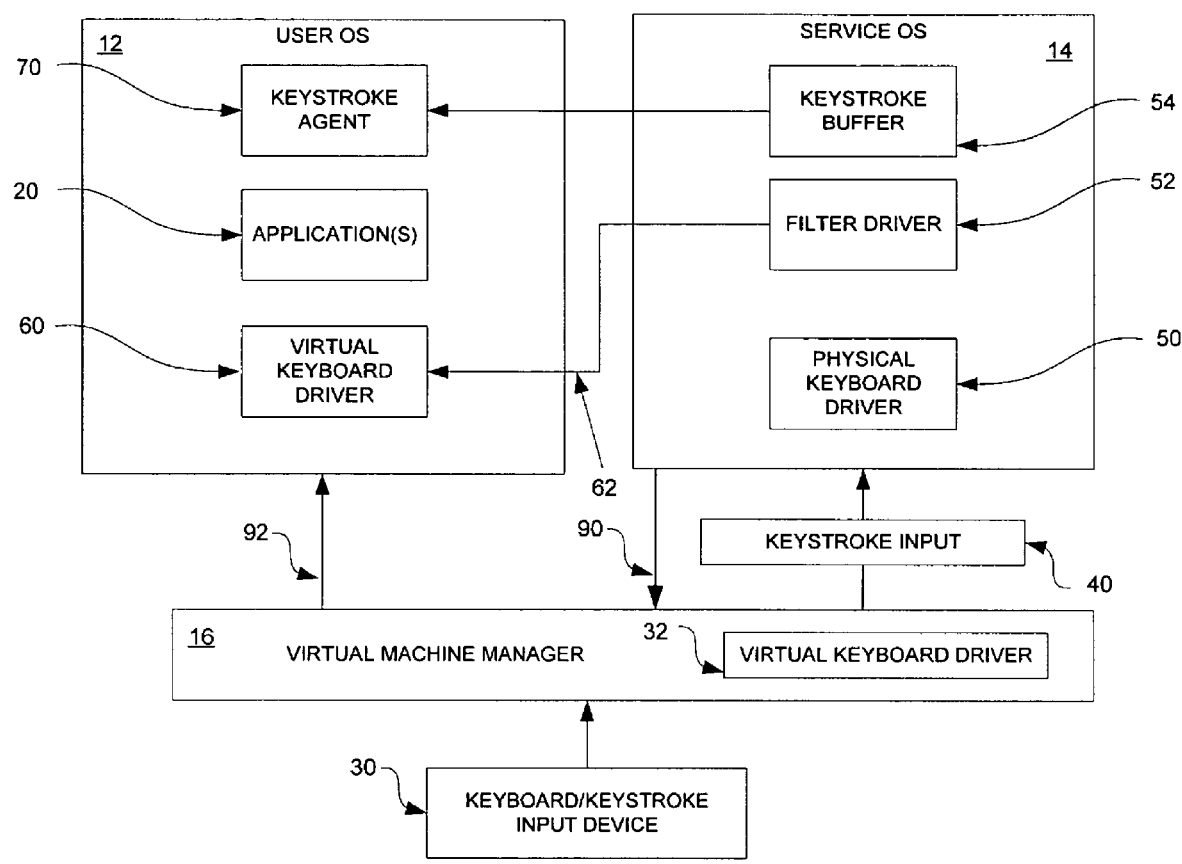
FIG. 3 is a diagram illustrating another embodiment of virtual user authentication system in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a virtual user authentication system 10 in accordance with the present invention. In the embodiment illustrated in FIG. 1, system 10 comprises a user operating system (OS) 12, a service OS 14 and a virtual machine manager (VMM) 16. VMM 16 comprises a software layer to virtualize a hardware interface to each of user OS 12 and service OS 14 disposed on a partitioned memory space. In the embodiment illustrated in FIG. 1, two instances of operating systems are illustrated as being interfaced by VMM 16. However, it should be understood that a greater quantity of operating systems may be virtualized using VMM 16.

In the embodiment illustrated in FIG. 1, user OS 12 is configured to be the primary operating system utilized by a user of a computing platform to access and/or otherwise utilize various applications 20 such as, but not limited to, a word processing application, internet browser, or a financial management application. Service OS 14 is used to process keystrokes received from a keyboard/keystroke input device 30 that are destined for application(s) 20 (e.g., being input in order to provide information to that particular application 20). For example, service OS 14 is configured to interface with VMM 16 and a keystroke agent 70 residing on user OS 12 to determine whether particular keystroke input by a user is associated with a security sensitive credential for a particular application 20 (e.g., a username, password, personal identification number (PIN), social security number, or other type of information of which security is a concern). Service OS 14 processes the keystroke input corresponding to the particular application 20 and facilitates providing the keystroke input to the particular application 20 such that a keystroke logger and/or scanning application that may be associated with and/or or otherwise integrated with a keyboard/input protocol stack of user OS 12 is not presented with the user's actual keystroke input, thereby providing enhanced security of the users authentication and/or security credentials.

In the embodiment illustrated in FIG. 1, VMM 16 comprises a virtual keyboard driver 32 which may comprise hardware, software, firmware or a combination thereof. Virtual keyboard driver 32 receives input from keyboard/keystroke input device 30 and communicates the keystroke input to service OS 14 (the input from keyboard/keystroke input device 30 is identified in FIG. 1 as keystroke input 40). Thus, in operation, input from keyboard/keystroke input device 30 destined for a particular application 20 residing on and/or otherwise executing on user OS 12 is intercepted by VMM 16 and instead transmitted to service OS 14.

In FIG. 1, service OS 14 comprises a physical keyboard driver 50, a filter driver 52 and a keystroke buffer 54. Physical keyboard driver 50 and filter driver 52 may comprise software, hardware, firmware or a combination thereof. Physical keyboard driver 50 receives and/or otherwise processes keystroke input 40 received from VMM 16. Filter driver 52 interfaces with physical keyboard driver 50 and/or application 20 to determine whether keystroke input 40 is associated with a security credential. For example, in some embodiments of the present invention, in response to a user launching and/or otherwise executing a particular application 20 and/or function associated with a particular application 20, filter driver 52 interfaces with application 20 to determine whether keystroke input 40 is associated with a security credential input for application 20 (e.g., an input window for a username, password or other type of security credential). If filter driver 52 determines that keystroke input 40 is associated with a security credential, filter driver 52 generates an arbitrary or miscellaneous placeholder character string corresponding to the characters forming keystroke input 40. For example, if keystroke input 40 comprises a password defined as "BLD1359", filter driver 52 generates arbitrary characters for each of the characters of keystroke input 40. Thus, in this example, filter driver 52 may generate a character string defined as "P**$&N2." It should be understood that the arbitrary placeholder characters may comprise a predetermined character string (e.g., all asterisks) or a randomly generated character string.

The arbitrary placeholder characters are transmitted by filter driver 52 to a virtual keyboard driver 60 associated with user OS 12 as indicated by arrow 62 in FIG. 1. Virtual keyboard driver 60 receives the arbitrary placeholder characters from filter driver 52 and processes the arbitrary placeholder characters as if it was keystroke input 40. For example, virtual keyboard driver 60 may display the arbitrary placeholder characters on a user interface and/or display device within an input window corresponding to the application 20. However, it should be understood that, at least for keystroke input 40 associated with security credentials, keystroke input 40 is not received and/or otherwise processed by virtual keyboard driver 60. Thus, a keystroke logger and/or scanner that may be attached to and/or otherwise interfacing with virtual keyboard driver 60 will have limited and/or no access to keystroke input 40.

Preferably, filter driver 52 also causes keystroke input 40 to be buffered within keystroke buffer 54. In FIG. 1, a keystroke agent 70 residing on user OS 12, which may comprise hardware, software, firmware or a combination thereof, interfaces with filter driver 52 and/or keystroke buffer 54 in response to a termination character of keystroke input 40 being received by service OS 14. As used herein, the termination character of keystroke input 40 is generally defined as the last or final character of a particular keystroke input followed by a standard "carriage return" (CR) character or when a user otherwise signals (e.g., clicks "OK" button, etc.) indicating an end of input. Thus, for example, for a password defined as "BLD1359," the termination of input would be signaled as character would be the number "9," followed by the carriage return (ENTER key) sequence or an invocation of an action within the application (e.g., a click "OK" button). In response to receiving the termination character of keystroke input 40, keystroke agent 70 interfaces with keystroke buffer 54 to automatically retrieve keystroke input 40 from keystroke buffer 54 and provides keystroke input 40 to the particular application 20 for which keystroke input 40 is destined. Thus, in this example, the time period for which a memory location may be scanned to determine and/or otherwise identify a security credential is substantially reduced. In the above-described example, keystroke input 40 is stored and/or buffered in keystroke buffer 54 until a termination character is received. However, it should also be understood that keystroke input 40 may be processed without buffering all characters of keystroke input 40 before providing keystroke input 40 to the destined application 20. For example, in some embodiments of the present invention, keystroke agent 70 may be configured to retrieve individual and/or groups of characters of keystroke input 40 on a continuous and/or periodic basis and provide such keystroke input 40 to the destined application 20.

In the embodiment described above, filter driver 52 generates arbitrary placeholder characters if keystroke input 40 is associated with a security credential. However, it should be understood that filter driver 52 may be configured to generate and transmit to virtual keyboard driver 60 arbitrary placeholder characters for all types of keystroke input 40 (e.g., whether associated with a security credential or not). Further, it should be understood that if keystroke input 40 is not associated with a security credential, the keystroke input 40 may be directly communicated to virtual keyboard driver 60 for processing thereby.

FIGS. 2A and 2B are flow diagrams illustrating an embodiment of a virtual user authentication method in accordance with the present invention. The method begins at block 200, where keystroke input 40 is received at VMM 16. At block 202, virtual keyboard driver 32 communicates keystroke input 40 to service OS 14. At decisional block 204, a determination is made whether keystroke input 40 is associated with a security credential and/or security-related application 20. If keystroke input 40 is not associated with a security credential and/or a security-related application 20, the method proceeds to block 206, where filter driver 52 transmits and/or otherwise communicates keystroke input 40 to virtual keyboard driver 60 of user OS 12. The method proceeds to block 208, where virtual keyboard driver 60 provides the received keystroke input 40 to the destined application 20.

If at decisional block 204 it is determined that keystroke input 40 is associated with a security credential and/or security-related application 20, the method proceeds to block 210, where filter driver 52 generates arbitrary and/or miscellaneous placeholder characters. At block 212, filter driver 52 transmits and/or otherwise communicates the placeholder characters to virtual keyboard driver 60 of user OS 12. At block 214, filter driver 52 causes keystroke input 40 to be buffered in keystroke buffer 54.

At decisional block 216, a determination is made whether a termination character of keystroke input 40 for the destined application 20 has been input/received. If the termination character has not yet been input/received, the method proceeds to block 214 where keystroke input 40 continues to be buffered in keystroke buffer 54. If at decisional block 216 it is determined that the termination character for keystroke input 40 has been input/received, the method proceeds to block 218, where keystroke agent 70 interfaces with keystroke buffer 54 to retrieve and/or otherwise obtain keystroke input 40 from keystroke buffer 54. At block 220, keystroke agent 70 provides the keystroke input 40 retrieved from keystroke buffer 54 to the destined application 20.

In the embodiment illustrated and described in connection with FIGS. 1, 2A and 2B, various types of communications and/or functions associated with processing keystroke input 40 are performed directly between service OS 14 and user OS 12 (e.g., communications between and/or access to keystroke buffer 54 of service OS 14 by keystroke agent 70 of user OS 12, communications between filter driver 52 of service OS 14 and virtual keyboard driver 60 of user OS 12, etc.). However, it should be understood that various types of communications and/or functions associated with the processing of keystroke input 40 may be processed and/or otherwise communicated between service OS 14 and user OS 12 via VMM 16. For example, in some embodiments of the present invention, the arbitrary and/or miscellaneous placeholder characters generated by filter driver 52 would be communicated to VMM 16 by service OS 14, and VMM 16 would communicate the arbitrary and/or miscellaneous placeholder characters to virtual keyboard driver 60. Further, for example, in some embodiments of the present invention, the keystroke input 40 stored in buffer 54 is communicated to VMM 16, and VMM 16 interfaces with keystroke agent 70 to facilitate providing the actual keystroke input 40 to a particular application 20. Thus, in some embodiments of the present invention, VMM 16 would act as a gatekeeper or controller for communications between different OS partitions for processing of keystroke input 40.

FIG. 3 is a diagram illustrating another embodiment of virtual user authentication system 10 in accordance with the present invention. In FIG. 3, filter driver 52 is illustrated as directly communicating and/or interfacing with virtual keyboard driver 60 indicated by arrow 62 for transmitting arbitrary placeholder characters (e.g., for security credential input) to virtual keyboard driver 60. In the embodiment illustrated in FIG. 3, if keystroke input is not associated with a security credential, such non-security credential input is communicated back to VMM 16 from service OS 14 as indicated by arrow 90, and provided to user OS 12 by VMM 16 as indicated by arrow 92.

Thus, embodiments of the present invention provide a bypass mechanism for processing keystroke input such that a keylogger or other type of keystroke scanning application that may be present on an operating system for which the keystroke input is destined (e.g., an application running on such operating system) has little or no access to the keystroke input. For example, embodiments of the present invention process utilize a virtual machine manager that intercepts the keystroke input and processes the keystroke input through a different operating system or platform. Further, embodiments of the present invention buffer the keystroke input in the bypass operating system until preferably all of the keystroke input is received, at which time the keystroke input is retrieved and loaded into the destined application, thereby significantly reducing time available for scanning a memory space for such keystroke input.

What is claimed is:

1. A virtual user authentication system, comprising:
a computing platform comprising a virtual machine manager (VMM) communicatively coupled to a user operating system (OS) and a service OS, the VMM configured to receive keystroke input destined for an application executing on the user OS and communicate the keystroke input to the service OS, the keystroke input processed by the service OS;
wherein the service OS is configured to determine whether the keystroke input is associated with a security sensitive credential;
wherein the service OS is configured to generate arbitrary placeholder characters corresponding to characters of the keystroke input if the keystroke input is associated with a security sensitive credential;
wherein the arbitrary placeholder characters are communicated to a virtual keyboard driver of the user OS.

2. The system of claim 1, further comprising a keystroke agent disposed on the user OS and configured to retrieve the keystroke input for the application.

3. The system of claim 1, further comprising a keystroke agent disposed on the user OS and configured to, in response to determining that a termination character associated with the keystroke input has been input, retrieve the keystroke input.

4. The system of claim 1, wherein the keystroke input processed by the service OS is communicated to a virtual keyboard driver of the user OS if the keystroke input is not associated with a security sensitive credential.

5. The system of claim 1, wherein the keystroke input is retrieved from the service OS by a keystroke agent residing on the user OS.

6. The system of claim 1, wherein the VMM is disposed between a keystroke input device and both of the user OS and the service OS.

7. A virtual user authentication method, comprising:
intercepting, by a computing platform, at a virtual machine manager (VMM), keystroke input provided by a keystroke input device and destined for an application executing on a user operating system (OS);
transmitting, by the computing platform, the keystroke input from the VMM to a service OS; and processing the keystroke input by the service OS;
determining, by the service OS, whether the keystroke input is associated with a security sensitive credential;
generating, by the service OS, arbitrary placeholder characters corresponding to characters of the keystroke input if the keystroke input is associated with a security credential;
transmitting the arbitrary placeholder characters to a virtual keyboard driver of the user OS.

8. The method of claim 7, further comprising retrieving, by a keystroke agent disposed on the user OS, the keystroke input in response to determining that a termination character associated with the keystroke input has been input.

9. The method of claim 7, further comprising buffering the keystroke input at the service OS at least until a termination character associated with the keystroke input is input.

10. The method of claim 7, further comprising retrieving, by a keystroke agent disposed on the user OS, the keystroke input from the service OS.

11. The method of claim 7, further comprising intercepting, by the VMM, keystroke input provided by a keystroke input device before the input is received by either of the user "OS and the service OS.

12. A virtual user authentication system, comprising:
means for transmitting keystroke input received at a virtual machine manager (VMM) to a service operating system (OS), the keystroke input destined for an application executing on a user OS; and
means for processing the keystroke input by the service OS;
means, at the service OS, for determining whether the keystroke input is associated with a security sensitive credential;
means for transmitting arbitrary placeholder characters corresponding to characters of the keystroke input to a virtual keyboard driver of the user OS.

13. The system of claim 12, further comprising means for buffering the keystroke input at the service OS at least until a termination character associated with the keystroke input is input.

14. The method of claim 12, wherein the VMM isolates the user OS and the service OS from a keystroke input device that provides the keystroke input.

* * * * *

UNITED STATES PATENT AND TRADEMARK OFFICE
CERTIFICATE OF CORRECTION

| | | |
|---|---|---|
| PATENT NO. | : 7,917,750 B2 | Page 1 of 1 |
| APPLICATION NO. | : 11/492617 | |
| DATED | : March 29, 2011 | |
| INVENTOR(S) | : Manuel Novoa et al. | |

It is certified that error appears in the above-identified patent and that said Letters Patent is hereby corrected as shown below:

In column 6, line 22, in Claim 11, delete ""OS" and insert -- OS --, therefor.

Signed and Sealed this
Twelfth Day of July, 2011

David J. Kappos
*Director of the United States Patent and Trademark Office*